United States Patent [19]

Togai

[11] Patent Number: 5,337,719
[45] Date of Patent: Aug. 16, 1994

[54] ENGINE CONTROL SYSTEM AND METHOD
[75] Inventor: Kazuhide Togai, Takatsuki, Japan
[73] Assignee: Mitsubishi Jidosha Kogyo Kabushiki Kaisha, Tokyo, Japan
[21] Appl. No.: 22,491
[22] Filed: Feb. 25, 1993
[30] Foreign Application Priority Data
  Feb. 28, 1992 [JP] Japan .................. 4-044005
[51] Int. Cl.⁵ .......................................... F02M 51/00
[52] U.S. Cl. .................... 123/478; 123/480; 123/684
[58] Field of Search ............... 123/478, 480, 494, 684

[56] References Cited

U.S. PATENT DOCUMENTS

| | | | |
|---|---|---|---|
| 5,159,914 | 11/1992 | Follmer et al. | 123/494 |
| 5,190,020 | 3/1993 | Cho | 123/684 |
| 5,191,531 | 3/1993 | Kurosu et al. | 123/478 |
| 5,211,150 | 5/1993 | Anzai | 123/480 |
| 5,226,393 | 7/1993 | Nagano et al. | 123/478 |

*Primary Examiner*—Raymond A. Nelli

[57] ABSTRACT

An engine control system to calculate the intake air quantity comprises engine revolution speed detecting means for producing an output signal of engine revolution data, intake air temperature detecting means for producing an output signal of intake air temperature data of the intake manifold, cylinder operation condition determining means for producing an output signal of the cylinder operating condition data for each engine cylinder, intake air pressure detecting means for producing an output signal of air pressure data of the intake manifold, intake air ratio compensation value calculating means for calculating, on the basis of the cylinder operation data of each cylinder an intake air ratio compensation value derived from the air pressure data of air in the intake manifold and the engine revolution speed data of the engine, and intake air quantity calculating means for calculating an intake air quantity on the basis of the intake air ratio compensation value. An engine control method to calculate the intake air quantity comprises the steps of detecting engine revolution data and intake air temperature data of the intake manifold, determining cylinder operation data of the engine, detecting intake air pressure of air in the intake manifold, calculating on the basis of the cylinder operation data an intake air ratio compensation value derived from the air pressure data of the manifold and the engine revolution speed data, and calculating an intake air quantity of air to be introduced into each engine cylinder on the basis of the intake air ratio compensation value.

30 Claims, 9 Drawing Sheets (HIGH SPEED CAM) VOLUME EFFICIENCY VARIATION MAP

ENGINE CONTROL SYSTEM AND METHOD

BACKGROUND OF THE INVENTION

The present invention relates to engine control system and method which are designed to utilize a speed density system for calculating the quantity of intake air in the combustion chamber of an internal combustion engine on the basis of pressure data in the intake manifold of the internal combustion engine.

The control system of the conventional internal combustion engine is so constructed that many operation data of the engine are gathered by many sensors for calculating predetermined control values in response to the operation data with a suitable calculating means so that many actuators are driven by output signals responsive to the calculated control values to enable many mechanisms to be controllably driven in response to the predetermined control values.

In the conventional internal combustion engine, the quantity of intake air (A/N) to be supplied to the combustion chamber is adjusted in response to the opening of a throttle valve, and the quantity of fuel corresponding to the quantity of intake air in response to the opening of the throttle valve and the revolution of the engine is supplied to the combustion chamber of the engine.

There has been well known in the art a typical engine which employs "a speed density system" for calculating intake air quantity data for use in a fuel supply mechanism and advanced angle quantity data for use in ignition timing control on the basis of pressure levels of air in the intake manifold. The speed density system is advantageous in that a pressure sensor is provided in an air duct held in communication with the intake manifold to sense pressure levels of air in the intake manifold by way of the air duct instead of an airflow sensor provided in the intake manifold to directly sense the quantity of intake air in the intake manifold, resulting in reducing the intake air resistance of the intake manifold and, thus, in decreasing costs of the sensors.

On the other hand, the internal combustion engine having such a speed density system is operated in such a manner that the intake air quantity is calculated in response to the vacuum pressure of air to be introduced into the intake manifold. In such an internal combustion engine wherein intake-exhaust mechanisms such as, for example, timing cams are exchanged while the cylinder operation modes are varied with the cylinders fully and partially operated, the relationship between the intake air pressure and the intake air quantity is fluctuated, thereby making it impossible to ensure desirable and adequate intake air quantity to be introduced into the cylinders of the engine.

SUMMARY OF THE INVENTION

It is therefore an object of the present invention to provide an engine control system and method for ensuring the desirable and adequate intake air quantity calculated by the speed density system.

An engine control system comprises engine revolution speed detecting means for detecting engine revolution speed of an engine to produce an output signal of engine revolution data of the engine, intake air temperature detecting means for detecting intake air temperature of air to be introduced into an intake manifold to produce an output signal of intake air temperature data of the intake manifold, cylinder operating condition determining means for determining cylinder operation data of the engine to produce an output signal of the cylinder operating condition data for each of the cylinders assembled in the engine, intake air pressure detecting means for detecting intake air pressure of air to be introduced into the intake manifold to produce an output signal of air pressure data of the intake manifold, intake air ratio compensation value calculating means for calculating on the basis of the cylinder operation data of each of the cylinders an intake air ratio compensation value derived from the air pressure data of air in the intake manifold and the engine revolution speed data of the engine, and intake air quantity calculating means for calculating an intake air quantity of air to be introduced into each of the cylinders of the engine on the basis of the intake air ratio compensation value.

An engine control method comprises the steps of; detecting engine revolution speed of an engine to produce an output signal of engine revolution data of the engine, detecting intake air temperature of air to be introduced into an intake manifold to produce an output signal of intake air temperature data of the intake manifold, determining cylinder operation data of the engine to produce an output signal of the cylinder operating condition data for each of the cylinders assembled in the engine, detecting intake air pressure of air to be introduced into the intake manifold to produce an output signal of air pressure data of the intake manifold, calculating on the basis of the cylinder operation data of each of the cylinders an intake air ratio compensation value derived from the air pressure data of air in the intake manifold and the engine revolution speed data of the engine, and calculating an intake air quantity of air to be introduced into each of the cylinders of the engine on the basis of the intake air ratio compensation value.

The system and method according to the present invention is constituted by detecting the engine revolution speed data, the intake air temperature data, the cylinder operating condition data and the intake air pressure data, calculating an intake air ratio compensation value derived from the air pressure data and the engine revolution data on the basis of the cylinder operating condition data, and calculating the intake air quantity on the basis of the intake air ratio compensation value. The intake air quantity thus calculated by the speed density system is desirable and adequate for the engine. In the system and the method according to the present invention, the intake air ratio compensation value calculated under the low speed operating condition of the engine is smaller than the intake air ratio compensation value calculated under the high speed operating condition of the engine but larger than the intake air ratio compensation value calculated under the cylinder unwork condition, so that the relationship between the intake air pressure and the intake air quantity is prevented from being deviated from the desirable relationship therebetween upon the variation between the full cylinder operating condition and the partial cylinder operating condition and upon the variation between the low speed and high speed operating conditions. In the system and method according to the present invention, the intake air ratio compensation value calculating means calculates for each of the cylinders an intake air ratio compensation value on a smooth leveled line from the intake air ratio compensation value calculated before the first time when the variation of the cylinder operating condition data is determined by the cylinder operating condition determining means to the intake air ratio compensation value calculated after the second time when the variation of the cylinder operating condition data is determined by the cylinder operating condition determining means, so that the intake air ratio compensation value in the present cylinder operating condition is not excessively deviated from the intake air ratio compensation value in the previous cylinder operating condition.

BRIEF DESCRIPTION OF THE DRAWINGS

The features and advantages of the engine control system and method according to the present invention will be more clearly understood from the following detailed description taken in conjunction with the accompanying drawings, in which.

DESCRIPTION OF THE PREFERRED EMBODIMENTS

Figure 1:
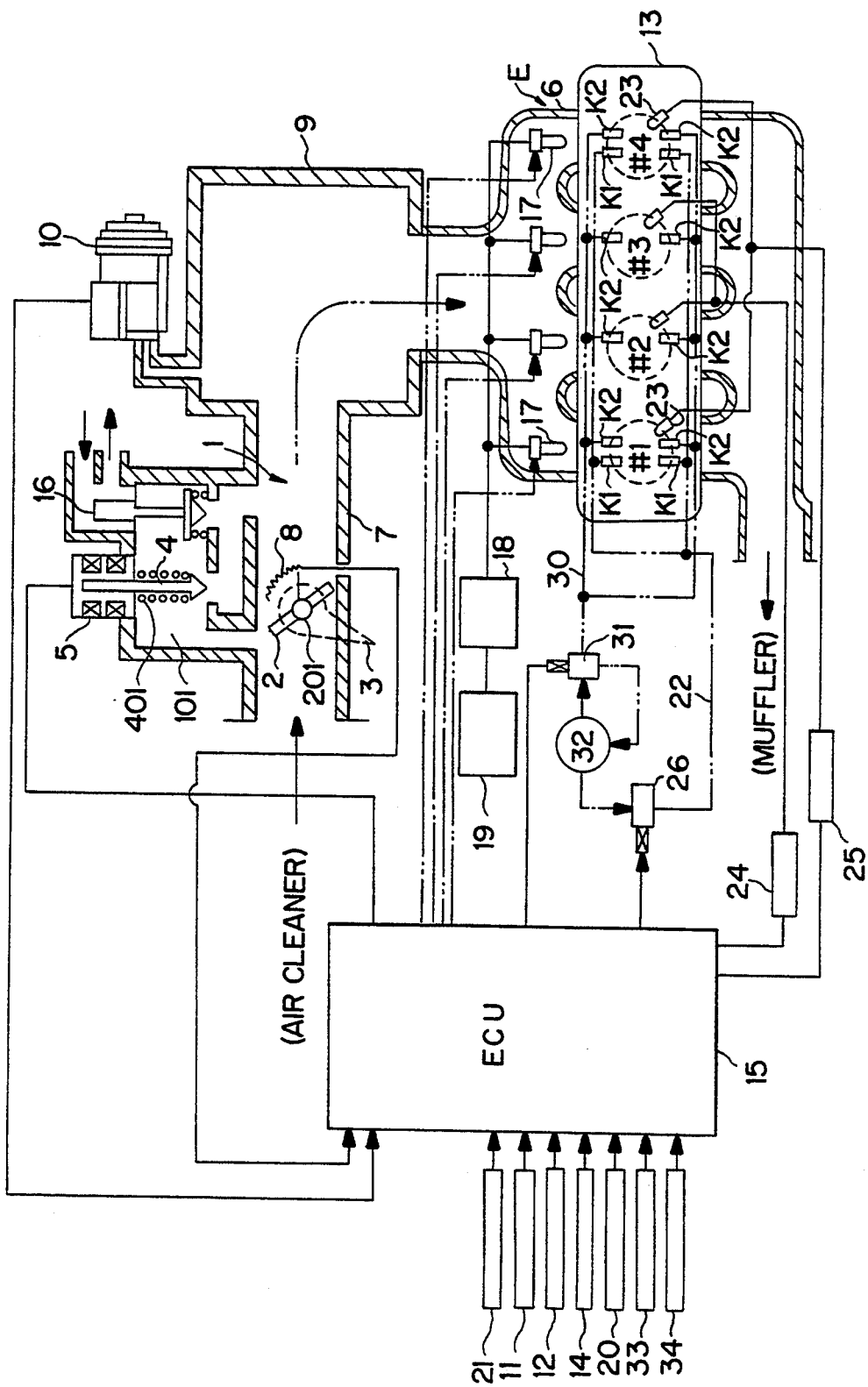
FIG. 1 is a general constitutional view of an engine ignition timing control system exemplifying the present invention.

An engine control system is shown is FIG. 1 as assembled in a four-cylinders, in-line engine (simply referred to as "engine E") having a mechanism for switching and varying valve motion conditions of intake and exhaust valves. The engine E comprises an intake manifold 1 which is constituted by an intake branched duct 6, a surge tank 9 securely connected to the intake branched duct 6, an intake duct 7 integrally formed with the surge tank 9, and an air cleaner not shown. The intake duct 7 is adapted to rotatably receive therein a throttle valve 2 having a rotational shaft 201 connected to a throttle lever 3 at the outer side of the intake manifold 1.

The throttle lever 3 is connected to and rotated by an accelerator pedal (not shown) in such a manner that the throttle valve 2 is rotated in clockwise and anti-clockwise directions as shown in FIG. 1 by the throttle lever 3. The throttle valve 2 is forced to be closed by a suitable return spring (not shown) when the accelerator pedal is released to its home position. The throttle valve 2 is assembled with a throttle valve opening sensor 8 for producing an output signal of the opening data of the throttle valve 2.

On the other hand, an intake bypass duct 101 is connected to the intake duct 7 in such a manner as to bypass the throttle valve 2 and is provided with an idle revolution control (ISC) valve 4 forced to be closed by a return spring 401 and driven by a stepping motor 5. The reference numeral 16 designates a first idle air valve which is designed to automatically perform a warming-up compensation in response to temperature of a coolant in the engine during the idling state of the engine.

Further, the intake air temperature detecting means comprises an intake air temperature sensor 14 provided in the intake manifold 1 for producing an output signal of the data for intake air temperature (Ta) of air to be introduced into the intake manifold 1. A coolant sensor 11 is provided in the engine for detecting the temperature of the coolant therein. The engine revolution speed detecting means comprises an engine revolution sensor 12 for detecting the engine revolution in the form of ignition pulses. The battery voltage detecting means comprises a battery sensor 27 for detecting a battery voltage VB. A knock sensor 21 is also provided for producing an output signal of knock data of the engine. The intake air pressure detecting means comprises a vacuum sensor 10 provided in the surge tank 9 for producing an intake air pressure (Pb) data of air to be introduced into the intake manifold 1.

The cylinder head 13 of the engine E comprises a plurality of cylinders formed with intake and exhaust ports which are closed and opened by intake and exhaust valves, respectively, in a well known manner. In FIG. 1, the intake and exhaust valves are formed in the second and third cylinders #2 and #3 to be opened and closed, while the intake and exhaust valves are similarly formed in the first and fourth cylinders #1 and #4 to be opened and closed. The second and third cylinders #2 and #3 are operated to be held always in their worked conditions, while the first and fourth cylinders #1 and #4 are operated to be held in their unworked conditions depending upon the operation modes of the engine. Disposed in opposing relation with each of the intake and exhaust valves is a rocker arm which is provided with a valve varying mechanism M for stopping and varying opening and closing of the intake and exhaust valves. The valve varying mechanism M is well known in construction and enables the valve motions of the intake and exhaust valves by selecting cam profiles of high and low cams or enables the valve motions of the intake and exhaust valves to be stopped. For example, a rocker shaft is integrally assembled with a main rocker arm opposing the intake and exhaust valves and rotatably supports high and low rocker arms. The rocker shaft and the high and low rocker arms are engaged with and disengaged from each other by a slidable engagement pin. The engagement pin is designed to be slidably moved by suitable hydraulic cylinders respectively forming low and high speed switching mechanisms K1 and K2. The intake and exhaust valves are moved through the cam profile of the high cam or the low cam integrally connected with the rocker shaft. The low speed switching mechanism K1 forming the valve varying mechanism is supplied with pressure oil through the hydraulic circuit 22 by the first electromagnet valve 26, while the high speed switching mechanism K2 is also supplied with pressure oil through the hydraulic circuit 30 by the second electromagnet valve 31. The first electromagnet valve 26 and the second electromagnet valve 31 are each constituted by a three-way valve and are maintained "OFF" during the operation of the cylinders at the low speed mode M-1 caused by the low speed cam, while the first electromagnet valve 26 and the second electromagnet valve 31 are maintained "ON" during the operation of the cylinders at high speed mode M-2 caused by the high speed cam. During the operation of the cylinders at the unworked partial cylinder operation mode (modulated displacement mode ) M-3, the first electromagnet valve 26 is maintained "ON" and the second electromagnet valve 31 is maintained "OFF". Both of the first and second electromagnet valves 26 and 31 are controlled respectively by output driving signals produced from the engine control unit (ECU) 15 which will be described hereinafter. On each of the cylinders in the cylinder head 13 is mounted an injector 17 for injecting fuel into each of the cylinders. Each of the injectors 17 is fed with the fuel from the fuel feeding source 19 while being adjusted in pressure by the fuel pressure adjusting means 18. The injection driving control for the injector 17 is performed by the engine control unit 15. An ignition plug 23 is assembled with each of the cylinders in the cylinder head 13 shown in FIG. 1 in such a manner that the ignition plugs 23 of the worked cylinders #2 and #3 are electrically connected to the ignitor 24 forming an ignition driving means, while the ignition plugs 23 of the unworked cylinders #1 and #4 are also electrically connected to the ignitor 25. Both of the ignitors 24 and 25 are connected to the output circuit of the engine control unit 15.

Under the all cylinders operated or worked mode, the worked cylinders #2, #3 and the unworked cylinders #1, #4 are alternately ignited at their respective target ignition timings $\Phi t$ at an interval of the crank angle 180 degrees, while under the unworked partial cylinders operation mode, i.e. the cylinders #1 and #4 held in their unworked conditions, only the worked cylinders #2 and #3 are ignited at thief target ignition timings $\Phi t$ while the unworked cylinders #2 and #3 are held in their unworked conditions.

The main portion of the engine control unit (ECU) 15 is constituted by a micro-computer which performs an intake air ratio compensation value calculating treatment and the like in addition to the fuel injection quantity control for the engine, the throttle valve driving control, the ignition timing control, and the cylinder motion switching control being all well known in the art.

The engine control unit 15 has such a function as to detect the engine revolution speed Ne, the intake air temperature Ta, the intake air pressure Pb and the cylinder motion data #n, respectively, by sensors 12, 14, 10 and the cylinder motion determining means 20, to calculate the intake air ratio compensation value Ken representing the relation of the intake air pressure Pb and the engine revolution speed Ne, in response to the cylinder motion data #n by the intake air ratio compensation value calculating means and to calculate the intake air quantity A/N for the internal combustion engine on the basis of the intake air ratio compensation value Ken, the intake air pressure Pb and the intake air temperature Ta.

The fuel feeding control is performed by way of the well known injector driving control treatment as will be described hereinlater.

The standard fuel pulse width Tf is calculated on the basis of the intake air quantity, multiplying the standard fuel pulse width Tf and the air-fuel ratio and other compensation coefficient to determine injector driving time, driving the injector 25 only for the worked cylinders #2 and #3 excluding the unworked cylinders #1 and #4 during the unworked partial cylinders operation mode, and driving the injectors 24 and 25 for the worked and unworked cylinders #1-#4 during the cylinders worked mode.

The engine control unit 15 is supplied respectively with the engine revolution Ne by the engine revolution sensor 12, with the throttle opening $\theta s$ by the throttle opening sensor 8, with the intake air pressure Pb by the vacuum sensor 10, with the coolant temperature Tw by the coolant sensor 11, with the unit crank angle signal $\Delta\theta$ by the crank angle sensor 33, and with the standard signal $\Phi 0$ by the #1 cylinder reference position sensor 34 (herein produced at every crank angle of 180 degrees). The discrimination of the driving signals outputted from the engine control unit 15 to the first and second electromagnet valves 26 and 31 results in determination of the cylinder motion data #n.

FIGS. 6 to 9 respectively shows flowcharts of the control program of the engine control unit 15 including the system for calculating the intake air quantity for the engine according to the present invention.

When the engine control unit is switched "ON", the main routine of the control unit is commenced.

Initially, the functions of the means incorporated in the engine control unit are checked together with the initial values set for the means of the engine control unit at the step a1. Subsequently, at the step a2 the engine control unit is supplied with the .operation data to be required for the engine control unit to cause the operation to the step a3.

When the engine control unit 15 is operated to switch the cylinders to their operation modes, the valve varying mechanism M is operated in such a manner that the first electromagnet valve 26 and the second electromagnet valve 31 are maintained "ON" or "OFF" for the operations of the cylinders in their respective modes. For example, the first and fourth cylinders #1 and #4 are controlled as being held in their unworked conditions during constant cruising speed in medium and low loads. The unworked partial cylinders operation mode M-3 for the first and fourth cylinders #1 and #4 is carried out by switching the unwork plug ICFLG. The first electromagnet valve 26 and the second electromagnet valve 31 are controlled selectively for the high speed operation mode M-2 caused by the high speed cam and for the low speed operation mode M-1 caused by the low speed cam on the basis of the engine revolutions Ne.

At the step a4 representing the ignition timing calculation stage, the target ignition timing $\Phi t$ is calculated and compensated in a well known calculation method by the coolant temperature Wt, the engine revolution Ne, the intake air quantity A/N, the load $\theta s$ and the like. At this time, the intake air quantity A/N is compensated by an intake air ratio compensation value Ken described hereinlater even if one of the operation modes M-1, M-2 and M-3 is varied and switched to the another one of the above mentioned operation modes through the cylinder motion switching control. The compensated value of the intake air quantity A/N is desirable and adequate for the combustion engine.

At the step a5 representing a dwell angle determination treatment, the dwell angle at the ignition treatment for each of the cylinders is calculated on the basis of the engine revolution Ne and the dwell angle calculation map.

At the step a6, other engine control treatment is performed to return the operation to the initial stage.

Figure 7:
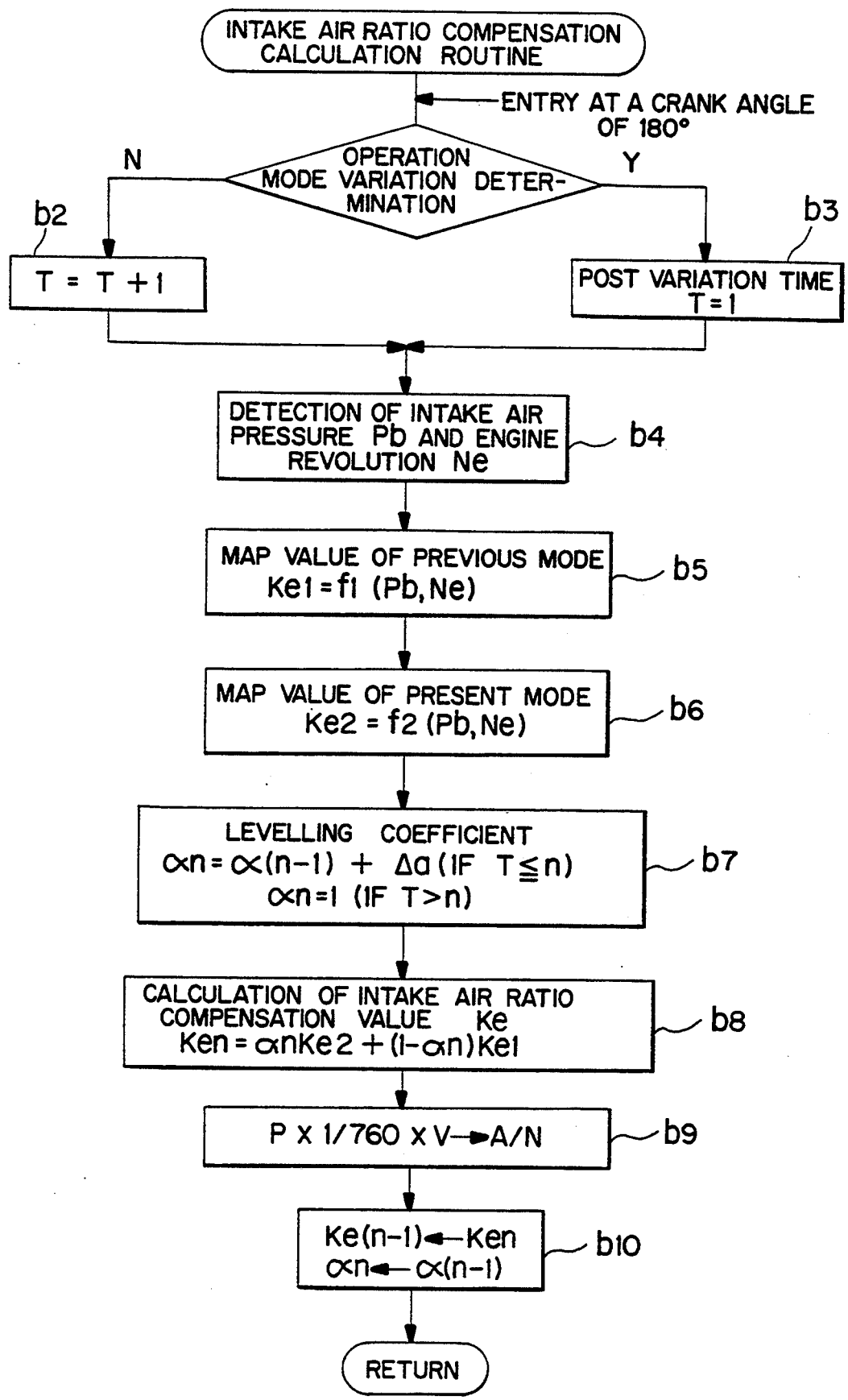
FIG. 7 is a flowchart showing an intake air ratio compensation value calculating routine performed by the engine control unit of the engine control system.

When the crank angle reaches a predetermined angle (180 degrees) on the halfway of the main routine, the intake air ratio compensation value is calculated by the intake air compensation value calculating means as shown in FIG. 7.

The unworked partial cylinders operation mode M-3 is detected on the basis of the "ON" condition of the first electromagnet valve 26 and the "OFF" condition of the second electromagnet valve 31. The low speed operation mode M-1 is determined by the first electromagnet valve 26 and the second electromagnet valve 31 simultaneously maintained in the "OFF" conditions, while the high speed operation mode M-2 is determined by the first electromagnet valve 26 and the second electromagnet valve 31 simultaneously maintained in the "ON" conditions. It is thus to be noted that each of the operation modes is thus determined by the operation mode variation determining means on the basis of the valve motion condition data #n of each of the cylinders.

When the present operation mode is determined by the operation mode variation determining means, the determining means determines whether or not the present operation mode is identical to the previous operation mode which is selected before the present operation at the step b1. Under the operation mode determined not to be varied from the previous operation mode, the operation advances to the step b2, However, under the operation mode determined to be varied from the previous operation mode, the operation advances to the step b3. At the step b3, the post variation time T is counted "1". At the step b2, the post variation time T is renewed by adding "1" thereto.

Figure 3:
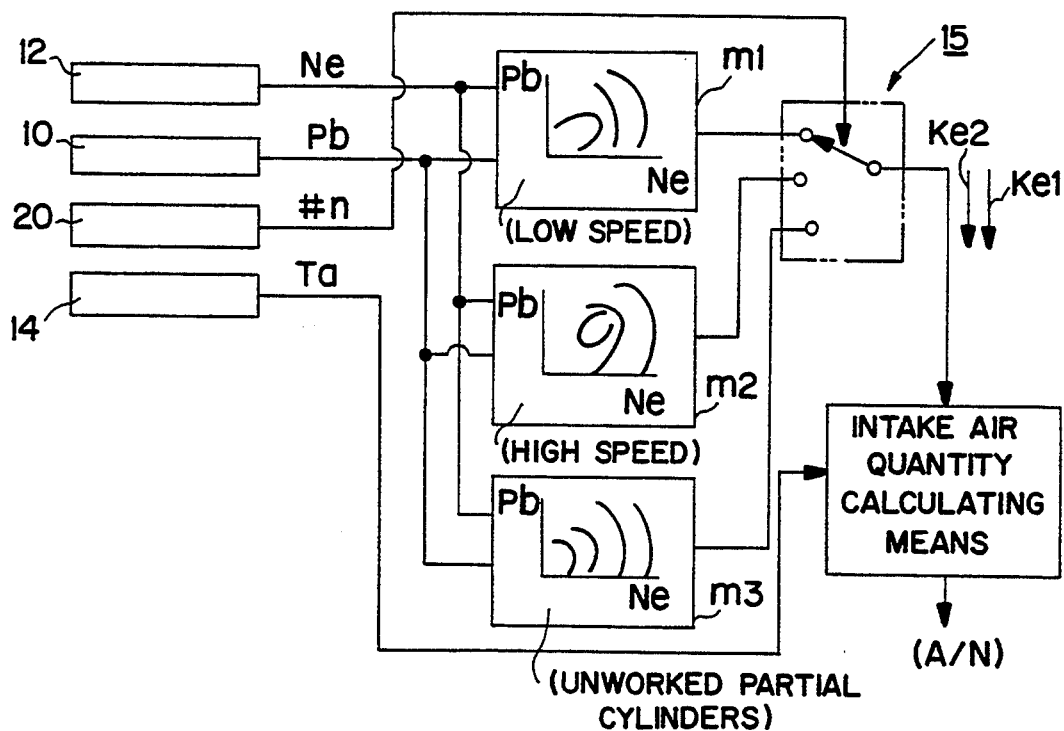
FIG. 3 is a block diagram showing intake air ratio compensation value calculating means and intake air quantity calculating means in the engine control system.
Figure 4:
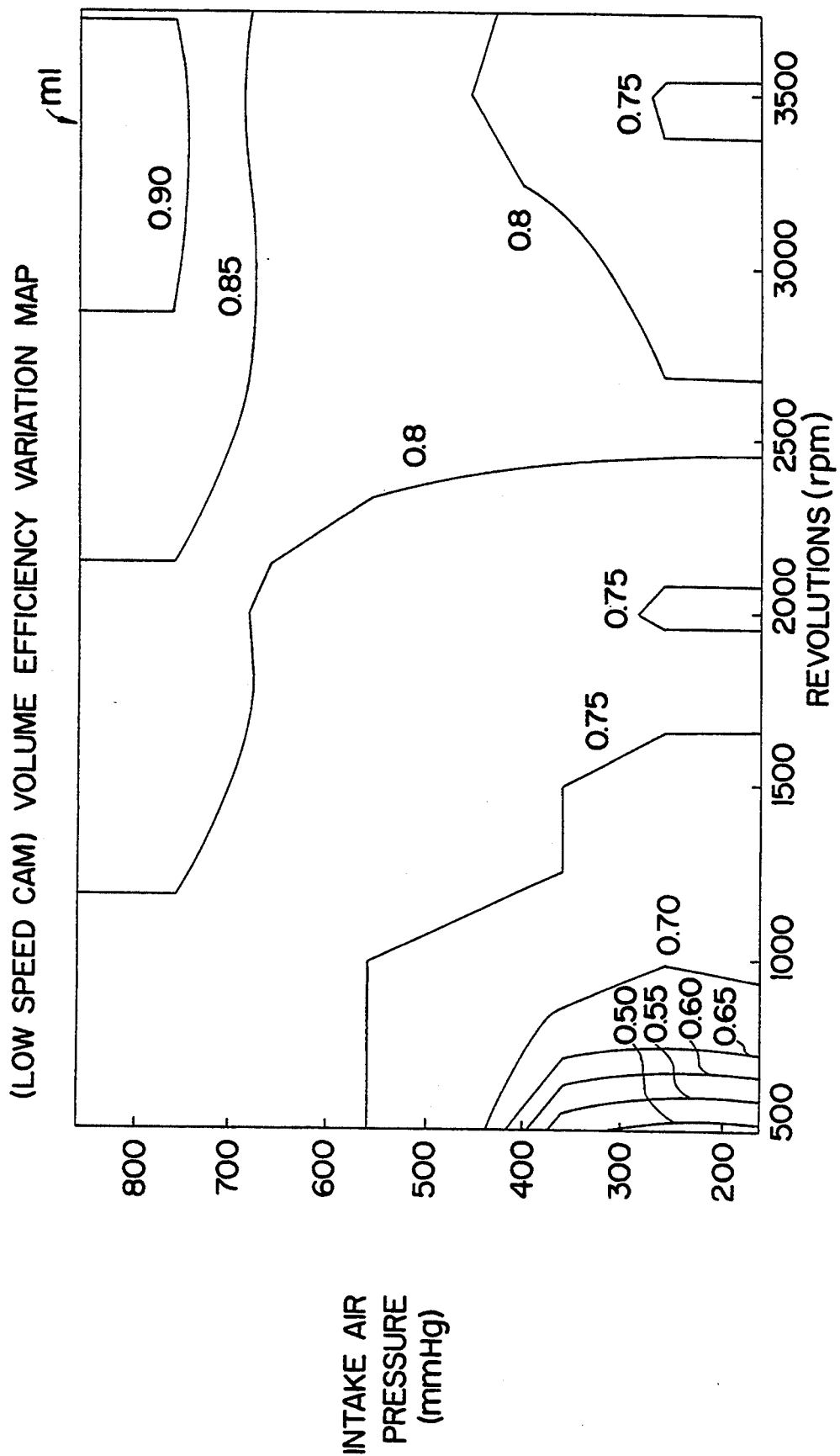
FIG. 4 is a characteristic block diagram showing a map used by the engine control unit of the engine control system for calculating the intake air ratio compensation value under the low speed operation mode.
Figure 5:
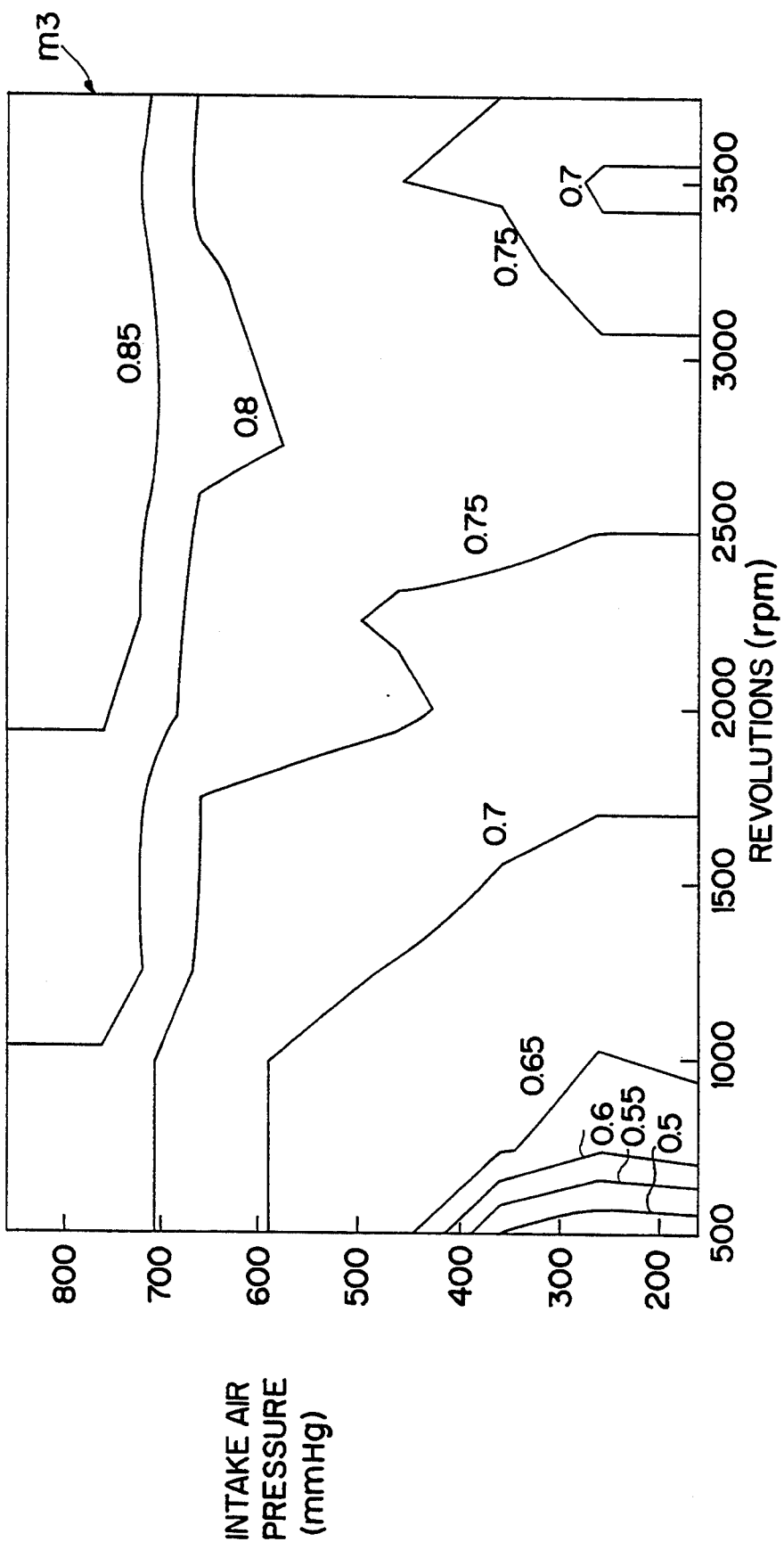
FIG. 5 is a characteristic block diagram showing a map used by the engine control unit of the engine control system for calculating the intake air ratio compensation value under the unworked cylinders operation mode.
Figure 6:
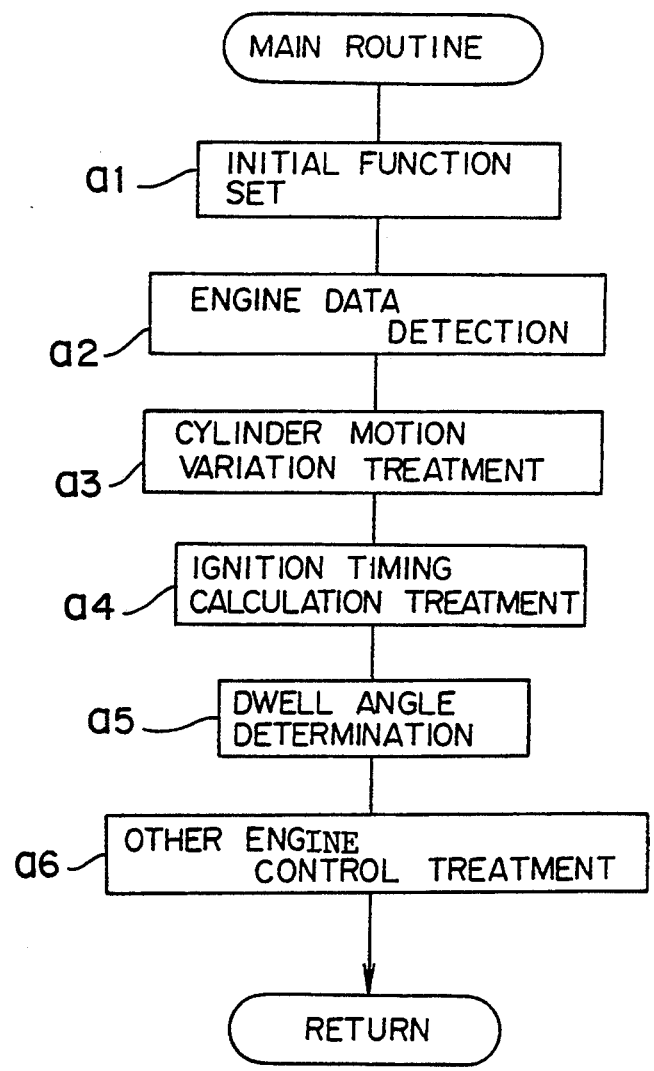
FIG. 6 is a flowchart showing a main routine of a control program performed by the engine control unit of the engine control system.
Figure 10:
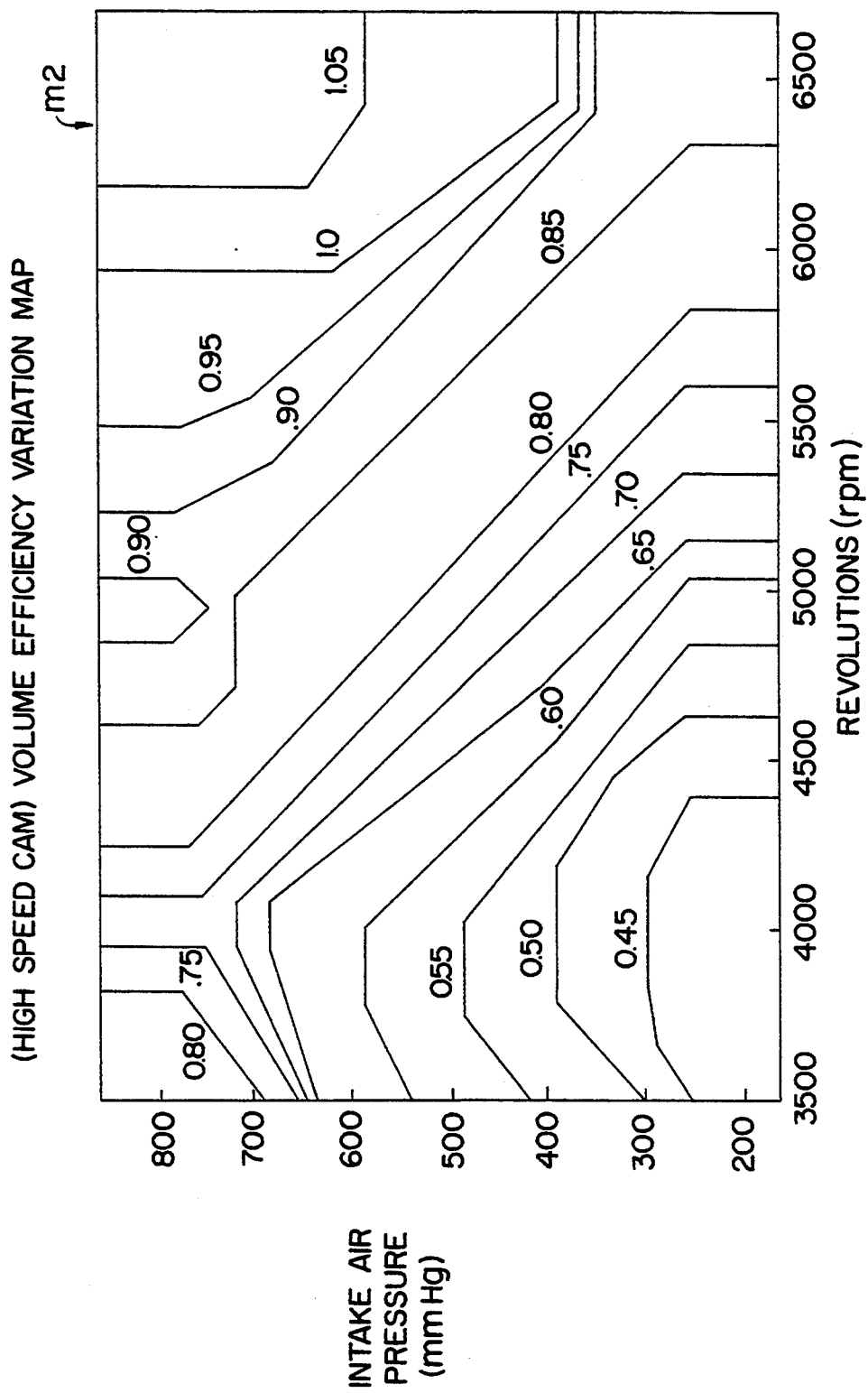
FIG. 10 is a characteristic block diagram showing a map for calculating the intake air ratio compensation value under the high speed operation mode.

When the operation reaches the step b4 from the steps b2 and b3, the engine revolution Ne and the intake air pressure Pb are detected by the engine revolution sensor 12 and the vacuum sensor 10, respectively. At the step b5, the previous operation mode is determined to be any one of the operation modes such as the low speed operation mode M-1, the high speed operation mode M-2 and the unworked partial cylinders operation mode M-3 so that the intake air ratio compensation value Ke1 of the previous operation mode is calculated by the intake air ratio compensation value calculation maps m1, m2 and m3 as shown in FIG. 3. In this case, the low speed operation map m1 is selected for the previous operation mode held in the low speed operation mode M-1, the high speed operation map m2 is also selected for the previous operation mode held in the high speed operation mode M-2, and the map m3 of the unworked cylinders operation is also selected for the previous operation mode held in the unworked partial cylinders moderation mode M-3. The maps m1, m2 and m3 are illustrated in enlarged scale in FIGS. 4, 5 and 10, respectively.

The values inputted in the maps m1, m2, m3 are established in such a manner that the engine revolution Ne and the intake air pressure Pb are relatively large and the values of the map m1 are smaller than the values of the map m2 in the operation areas usually employed. At the step b6, the present operation mode is determined to be any one of the operation modes such as the low speed operation mode M-1, the high speed operation mode M-2 and the unworked partial cylinders operation mode M-3 so that intake air ratio compensation value Ke1 of the present operation mode is calculated by the intake air ratio compensation value calculation maps m1, m2 and m3 as shown in FIG. 3 in the similar method as mentioned above.

At the steps b7 and b8, the intake air ratio compensation value Ken is calculated on and along a smooth level line connecting the previous intake air ratio compensation value Ke1 and the present intake air ratio compensation value Ke2. For the calculation of the compensation value Ken, the following equation (3) is used, and the smooth leveling coefficient $an$ is calculated for the present operation mode by the following equation (1) and (2). In this case, the above calculations are performed with the equation (1) for the post variation time T lower than the predetermined value n and with the equation (2) for the post variation T higher than the predetermined value n. $\Delta a$ represents a smooth leveling ratio which is, for example, established at about 0.1.

$$an = a(n-1) + \Delta a \quad (1)$$

$$an = 1 \quad (2)$$

$$Ken = anKe2 + (1-an)Ke1 \quad (3)$$

Figure 2:
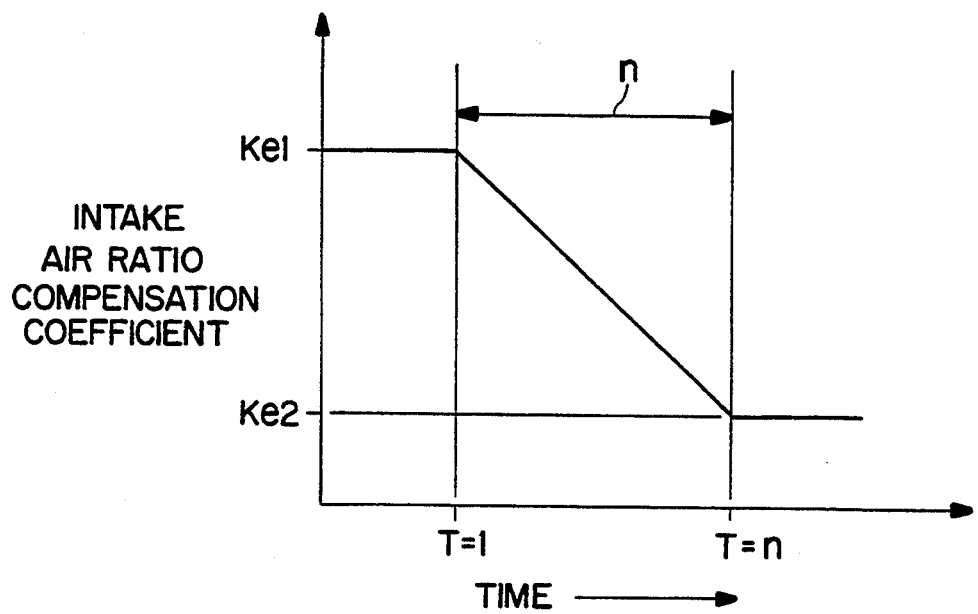
FIG. 2 is a block diagram showing the progressive variation of the intake air ratio compensation value calculated by the engine control system.

One example of the progressive variation characteristic of the intake air ratio compensation value Ken thus calculated as above is shown in FIG. 2. It will be understood form FIG. 2 that the previous intake air ratio compensation value Ke1 is progressively corrected to approach the present intake air ratio compensation value Ke2. This treatment results in compensating the intake air ratio compensation value which is impossible to be accurately calculated upon the variation from one of the operation modes to the other of the operation modes so that the intake air ratio compensation value Ken is prevented from being excessively deviated from the target value.

At the step b9, the intake air quantity A/N is calculated by the following equation (4) on the basis of the condition equation (P·V=N·R·Ta) of the intake air and is then stored in a predetermined area. In the equation, P is cylinder pressure at the lower dead point, V is cylinder volume, N is molecular number, R is gas constant, and Ta is intake air temperature. The cylinder pressure P at the lower dead point is calculated by the equation (P=Pv Ken) with the compensation of the intake air ratio compensation value Ken by the intake air pressure Pb.

$$P \; 1/760 \; V \rightarrow A/N$$

At the step b10, the present intake air ratio compensation value Ken is stored in the area Ke(n−1) of the previous intake air ratio compensation value, and the present smooth leveling coefficient an is stored in the previous smooth leveling area (n−1) so as to return the operation to the main routine.

Figure 8:
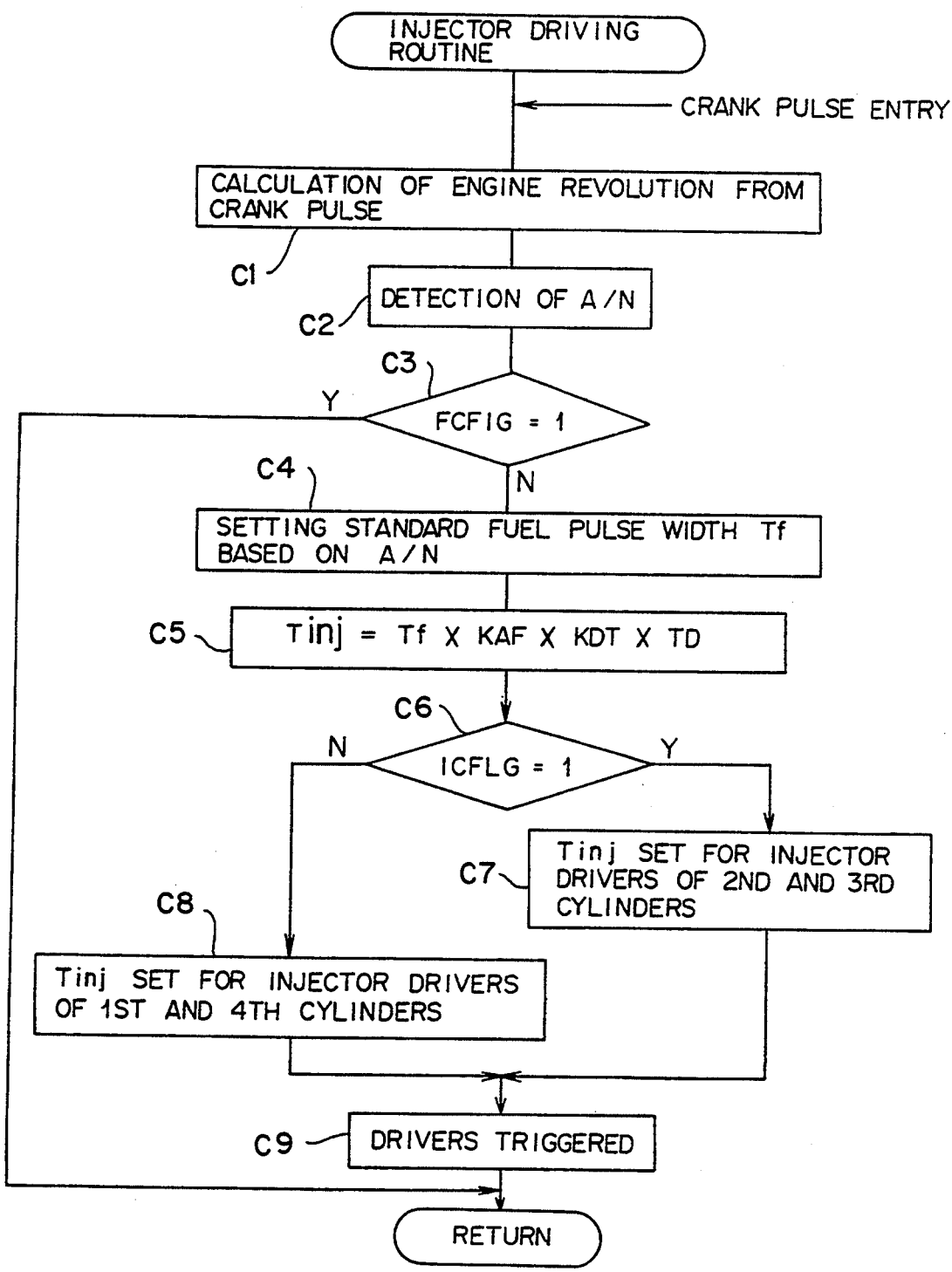
FIG. 8 is a flowchart showing an injector driving routine performed by the engine control unit of the engine control system.

The injector driving treatment performed on the halfway of the main routine will then be described in FIG. 8.

The injector driving routine of the injection time calculating means is carried out every time of entry of a unit crank angle signal $\Delta\theta$ (pulse signal), while the engine revolution Ne and the intake air quantity A/N calculated in the intake air ratio compensation value calculation routine is supplied to the engine control unit 15. At the step C3, the fuel cut data is calculated so that the operation is returned upon the fuel cut data while the operation advances the step C4 upon fuel non-cut data. At the step C4, the standard fuel pulse width Tf is calculated on the basis of the intake air quantity, and then the target fuel pulse width Tinj is calculated by the air-fuel ratio compensation coefficient KAF, the compensation coefficient KDT of the atmospheric temperature and pressure, the injector action delay compensation value TD and the like.

At the step C6, the cylinder operation modes are determined as being "ICFLG=1" or not. The "ICFLG=1" designated the cylinder unworked condition so that the operation advances to the step C8 upon all the cylinders being operated while the operation advances to the step C7 upon the cylinders being partially operated. At the step C8, the drivers for all the injectors 17 of the first to fourth cylinders are each set with target fuel pulse width Tinj, while at the step C7 with the cylinders partially operated, the drivers for the injectors 17 of the second and third cylinders are each set with target fuel pulse width Tinj. Each of the drivers are triggered to have the operation to be returned. As a result, the injectors 17 are driven at their predetermined timings to inject fuel into the cylinders, respectively, for example, the second and third cylinders under the unwork cylinder mode M-1, and the first to fourth cylinders under the high and low speed operation modes M-1 and M-2.

Figure 9:
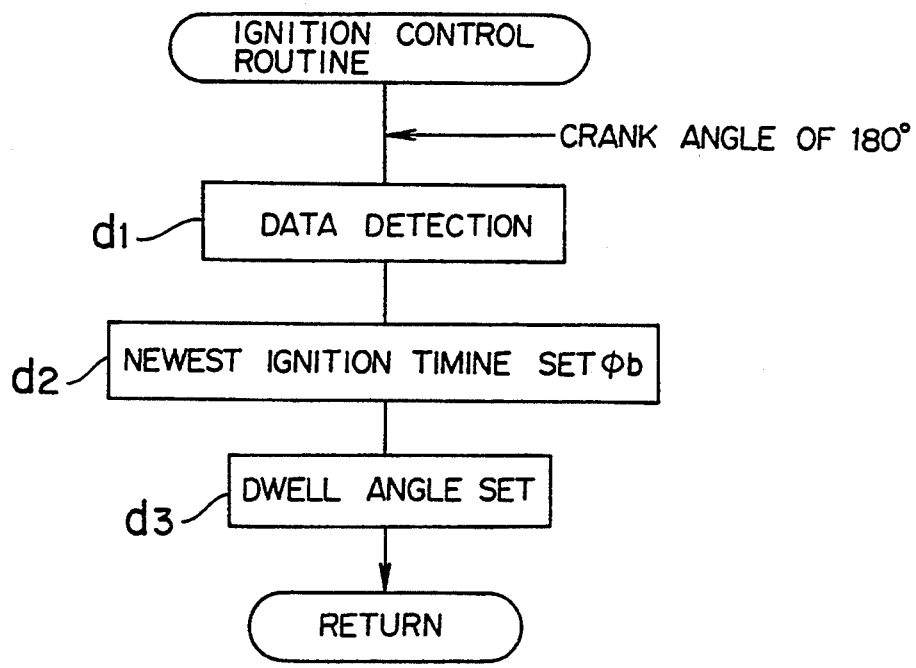
FIG. 9 is a flowchart showing an ignition control routine performed by the engine control unit of the engine control system.

The ignition control treatment will then be described in FIG. 9 on the halfway of the main routine. The ignition control routine is carried out by entering the main routine on the basis of the fact that the standard signal $\Phi 0$ is varied from "OFF" to "ON" at every time when the crank angle reaches 75 degrees (75° BTDC) before the upper dead point of the cylinder. At the step d1, the predetermined data is supplied to the engine control unit 15. At the steps d2 and d3 the newest target ignition timing $\Phi t$ and the newest dwell angle are set to the predetermined counter terminal of the ignition driving circuit, and the operation is then returned to the main routine. The second and third cylinders #2 and #3 are simultaneously driven by the ignitor 24 and the first and fourth cylinders #1 and #4 are also simultaneously driven by the ignitor 25 under the low and high speed operation modes so that any one of the groups forming the former cylinders #2, #3 and the latter cylinders #1, #4 is ignited at the vicinity of the compression upper dead point and the other of the groups is ignited at the vicinity of the exhaust upper dead point when the ignitors are driven at the crank angle of 180 degrees. The ignition treatments for the groups of the cylinders are alternately carried out.

The engine control system and method according to the present invention is constituted by detecting the engine revolution speed data, the intake air temperature data, the cylinder operation condition data and the intake air pressure data with the sensors and the determining means, and calculating on the basis of the cylinder operation condition data the intake air ratio compensation value derived from the air pressure data of air in the intake manifold and the engine revolution speed data of the engine, and calculating the intake air quantity on the basis of the intake air ratio compensation value, the intake air pressure data and the intake air temperature data, so that the intake air quantity to be calculated by the speed density system is desirable and adequate for the engine.

Further, the engine control system and method according to the present invention have such advantages as to be able to perform an idle revolution control for an automotive vehicle together with ISC valves and to effectively use an engine assembled with a valve variation mechanism. Especially, the system and method of the present invention is most advantageous in the case that the system and method are used for automotive vehicles having a wide range of operation conditions such as engine revolutions and frequent variations between high and low operating conditions and the unwork cylinder condition.

What is claimed is:

1. A system for controlling an internal combustion engine, comprising:
   engine revolution speed detecting means for detecting an engine revolution speed of an engine and producing an output data signal thereof;
   intake air temperature detecting means for detecting an intake air temperature of air to be introduced into an intake manifold and producing an output data signal thereof;
   cylinder operating condition determining means for determining cylinder operating data of said engine and producing an output data signal for each of a plurality of cylinders of said engine;
   intake air pressure detecting means for detecting an intake air pressure of air to be introduced into said intake manifold and producing an output data signal thereof;
   intake air ratio compensation value calculating means for calculating, on the basis of said cylinder operating data of each of said cylinders, an intake air ratio compensation value derived from said air pressure output data signal and said engine revolution speed output data signal; and
   intake air quantity calculating means for calculating a quantity of intake air to be introduced into each of said cylinders on the basis of said intake air ratio compensation value.

2. The system as set forth in claim 1, wherein said engine revolution speed detecting means comprises an engine revolution speed sensor for detecting said engine revolution speed in the form of ignition pulses.

3. The system as set forth in claim 1, wherein said intake air temperature detecting means comprises an intake air temperature sensor provided in said intake manifold.

4. The system as set forth in claim 1, wherein said intake air pressure detecting means comprises a vacuum sensor provided in said intake manifold.

5. The system as set forth in claim 1, wherein said cylinder operating condition determining means determines a cylinder unwork condition under which said cylinders are held partially in their unworked conditions and a cylinder work condition under which all said cylinders are held in their worked conditions.

6. The system as set forth in claim 5, wherein said intake air compensation value calculated under said cylinder work condition is larger than said intake air ratio compensation value calculated under said cylinder unwork condition.

7. The system as set forth in claim 1, wherein said cylinder operating condition determining means determines a high speed operation mode which is under a valve motion condition suitable for a high speed operating condition of said engine and a low speed operation mode which is under a valve motion condition suitable for a low speed operating condition of said engine.

8. The system as set forth in claim 7, wherein said intake air ratio compensation value calculated under said high speed operating condition is larger than said intake air ratio compensation value calculated under said low speed operating condition.

9. The system as set forth in claim 1, wherein said cylinder operating condition determining means determines a cylinder unwork condition under which said cylinders are held partially in their unworked conditions, a high speed operation mode which is under a valve motion condition suitable for a high speed operating condition of said engine and a low speed operation mode which is under a valve motion condition suitable for a low speed operating condition of said engine.

10. The system as set forth in claim 9, wherein said intake air ratio compensation value calculated under said low speed operating condition is smaller than said intake air ratio compensation value calculated under said high speed operation condition but larger than said intake air ratio compensation value calculated under the said cylinder unwork condition.

11. The system as set forth in claim 1, wherein said intake air ratio compensation value calculating means comprises operation mode variation determining means for determining the variation of said cylinder operating condition output data signal, and calculates for each of said cylinders an intake air ratio compensation value on a smooth leveled line from said intake air ratio compensation value calculated before a first time when the variation of said cylinder operating condition determining means to said intake air ratio compensation value calculated after a second time when the variation of said cylinder operating condition output data signal is determined by said cylinder operating condition determining means.

12. The system as set forth in claim 11, wherein said operation mode variation determining means includes means for calculating the time lapse from the variation of said cylinder operating condition output data signal.

13. The system as set forth in claim 1, wherein said intake air ratio compensation value calculating means comprises operation mode variation determining means for determining the variation of said cylinder operating condition output data signal, and calculates for each of said cylinders an intake air ratio compensation value calculated at a predetermined time lapse after the variation of said cylinder operating condition output data signal is determined by said cylinder operating condition determining means.

14. The system as set forth in claim 13, wherein said operation mode variation determining means includes means for calculating the time lapse from the variation of said cylinder operation condition output data signal.

15. The system as set forth in claim 1, further comprising injection time calculating means for calculating injection time of fuel to be injected into each of said cylinders from a fuel injecting valve for each of said cylinders on the basis of said quantity of intake air to be introduced in each of said cylinders.

16. A method for controlling an internal combustion engine, comprising the steps of:
  detecting engine revolution speed of an engine and producing an output data signal thereof;
  detecting intake air temperature of air to be introduced into an intake manifold and producing an output data signal thereof;
  determining cylinder operation data of said engine and producing an output data signal for each of a plurality of cylinders of said engine;
  detecting an intake air pressure of air to be introduced into said intake manifold and producing an output data signal thereof;
  calculating, on the basis of said cylinder operation data of each of said cylinders, an intake air ratio compensation value derived from said air pressure output data signal and said engine revolution speed output data signal; and
  calculating a quantity of intake air to be introduced into each of said cylinders on the basis of said intake air ratio compensation value.

17. The method as set forth in claim 16, wherein said engine revolution speed detection is performed by an engine revolution speed sensor for detection of said engine revolution speed in the form of ignition pulses.

18. The method as set forth in claim 16, wherein said intake air temperature detection is performed by an intake air temperature sensor provided in said intake manifold.

19. The method as set forth in claim 15, wherein said intake air pressure detection is performed by a vacuum sensor provided in said intake manifold.

20. The method as set forth in claim 16, wherein said cylinder operating condition determining step includes determining a cylinder unwork condition under which said cylinders are held partially in their unworked conditions and a cylinder work condition under which all said cylinders are held in their worked conditions.

21. The method as set forth in claim 20, wherein said intake air compensation value calculated under said cylinder work condition is larger than said intake air ratio compensation value calculated under said cylinder unwork condition.

22. The method as set forth in claim 16, wherein said cylinder operating condition determining step includes determining a high speed operation mode which is under a valve motion condition suitable for a high speed operating condition of said engine and a low speed operation mode which is under a valve motion condition suitable for a low speed operating condition of said engine.

23. The method as set forth in claim 22, wherein said intake air ratio compensation value calculated under said high speed operating condition is larger than said intake air ratio compensation value calculated under said low speed operating condition.

24. The method as set forth in claim 16, wherein said cylinder operating condition determining step includes determining a cylinder unwork condition under which said cylinders are held partially in their unworked conditions, a high speed operation mode which is under a valve motion condition suitable for a high speed operating condition of said engine and a low speed operation mode which is under a valve motion condition suitable for a low speed operating condition of said engine.

25. The method as set forth in claim 24, wherein said intake air ratio compensation value calculated under said low speed operating condition is smaller than said intake air ratio compensation value calculated under said high speed operation condition but larger than said intake air ratio compensation value calculated under said cylinder unwork condition.

26. The method as set forth in claim 16, wherein said intake air ratio compensation value calculating step includes determining the variation of said cylinder operating condition output data signal, and calculating for each of said cylinders an intake air ratio compensation value on a smooth leveled line from said intake air ratio compensation value calculated before a first time when the variation of said cylinder operating condition output data signal is determined by said cylinder operating condition determining means to said intake air ratio compensation value calculated after a second time when the variation of said cylinder operating condition output data signal is determined by said cylinder operating condition determining means.

27. The method as set forth in claim 26, wherein said operation mode variation determining step includes calculating the time lapse from the variation of said cylinder operating condition output data signal.

28. The method as set forth in claim 16, wherein said intake air ratio compensation value calculating step comprises determining the variation of said cylinder operating condition output data signal, and calculating for each of said cylinders an intake air ratio compensation value calculated at a predetermined time lapse after the variation of said cylinder operating condition output data signal is determined by said cylinder operating condition determining means.

29. The method as set forth in claim 28, wherein said operation mode variation determining step includes calculating the time lapse from the variation of said cylinder operating condition output data signal.

30. The method as set forth in claim 16, further comprising the step of calculating injection time of fuel to be injected into each of said cylinders from a fuel injecting valve for each of said cylinders on the basis of said quantity of intake air to be introduced in each of said cylinders.

* * * * *